(12) United States Patent
Kim et al.

(10) Patent No.: US 12,351,710 B2
(45) Date of Patent: Jul. 8, 2025

(54) METHOD FOR PREPARING POLYVINYL BUTYRAL RESIN COMPOSITION, AND GLASS-ADHESIVE FILM COMPRISING SAME

(71) Applicant: SK microworks Co., Ltd., Suwon-si (KR)

(72) Inventors: Hyejin Kim, Suwon-si (KR); Jooyoung Jung, Pyeongtaek-si (KR); Jiyeon Ryu, Suwon-si (KR); Jewon Yeon, Suwon-si (KR)

(73) Assignee: SK microworks Co., Ltd., Suwon-si (KR)

( * ) Notice: Subject to any disclaimer, the term of this patent is extended or adjusted under 35 U.S.C. 154(b) by 1223 days.

(21) Appl. No.: 17/140,504

(22) Filed: Jan. 4, 2021

(65) Prior Publication Data

US 2021/0130599 A1    May 6, 2021

Related U.S. Application Data

(63) Continuation of application No. PCT/KR2019/002701, filed on Mar. 8, 2019.

(30) Foreign Application Priority Data

Aug. 16, 2018 (KR) ........................ 10-2018-0095766

(51) Int. Cl.
*C08L 29/14* (2006.01)
*B32B 17/10* (2006.01)
*C08K 5/092* (2006.01)

(52) U.S. Cl.
CPC ........ *C08L 29/14* (2013.01); *B32B 17/10036* (2013.01); *B32B 17/10605* (2013.01); *B32B 17/10761* (2013.01); *C08K 5/092* (2013.01); *B32B 2250/03* (2013.01); *B32B 2250/40* (2013.01); *B32B 2307/412* (2013.01); *B32B 2329/06* (2013.01); *B32B 2605/006* (2013.01); *B32B 2605/08* (2013.01); *C08L 2203/16* (2013.01)

(58) Field of Classification Search
CPC ...... C08L 29/14; C08L 2203/16; C08K 5/103
See application file for complete search history.

(56) References Cited

U.S. PATENT DOCUMENTS

| | | | |
|---|---|---|---|
| 5,384,346 A | 1/1995 | Gutweiler et al. | |
| 5,573,842 A | 11/1996 | Gutweiler | |
| 8,722,194 B2 | 5/2014 | Asanuma et al. | |
| 2003/0059371 A1* | 3/2003 | Matson | A61K 49/0409 523/105 |
| 2004/0157987 A1* | 8/2004 | Miyake | C08G 4/00 525/33 |
| 2012/0244468 A1* | 9/2012 | Asai | C09D 11/326 524/502 |
| 2016/0271911 A1* | 9/2016 | Kusudou | C08L 29/14 |
| 2017/0334173 A1* | 11/2017 | Yui | B32B 17/10743 |
| 2019/0322855 A1* | 10/2019 | Hiura | B65D 65/46 |

FOREIGN PATENT DOCUMENTS

| | | |
|---|---|---|
| CN | 1638959 A | 7/2005 |
| CN | 103467897 A | 12/2013 |
| CN | 107108350 A | 8/2017 |
| JP | 5060496 B2 | 10/2012 |
| JP | 5588091 B2 | 9/2014 |
| JP | 5926602 B2 | 5/2016 |
| KR | 10-2008-0034150 A | 4/2008 |
| KR | 10-1492549 B1 | 2/2015 |
| KR | 10-2015-0133817 A | 11/2015 |
| KR | 10-2015-0135428 A | 12/2015 |
| KR | 10-2016-0077138 A | 7/2016 |

OTHER PUBLICATIONS

International Search Report issued on Jul. 8, 2019 in counterpart International Patent Application No. PCT/KR2019/002701 (2 pages in English and 2 pages in Korean).

* cited by examiner

*Primary Examiner* — Alicia Bland
(74) *Attorney, Agent, or Firm* — NSIP Law

(57) ABSTRACT

The method of producing a polyvinyl butyral resin of the present disclosure enable manufacture of a film of which yellow index is low and durability is enhanced, when a film for lamination is manufactured, by advancing acetalization reaction of a polyvinyl alcohol resin and a butanal in the presence of a hydroxy butyric acid.

6 Claims, No Drawings

METHOD FOR PREPARING POLYVINYL BUTYRAL RESIN COMPOSITION, AND GLASS-ADHESIVE FILM COMPRISING SAME

CROSS-REFERENCE TO RELATED APPLICATIONS

This application is a continuation of International Application No. PCT/KR2019/002701 filed on Mar. 8, 2019, which claims the benefit of Korean Patent Application No. 10-2018-0095766 filed on Aug. 16, 2018, in the Korean Intellectual Property Office, the entire disclosures of which are incorporated herein by reference for all purposes.

BACKGROUND

1. Field

The present disclosure relates to a method of producing a polyvinyl butyral resin composition and a film for glass lamination including the polyvinyl butyral resin composition.

2. Description of the Background

In general, laminated glass (e.g., tempered glass and safety glass) consisting of a pair of glass panels and a synthetic resin film inserted therebetween is widely used for window glass in road vehicles such as automobiles because of its enhanced safety due to the fact that its fragments are not scattered even when the glass is broken. In some cases, a polyvinyl acetal resin having a high affinity for inorganic materials is utilized in the film applied to such laminated glass.

A polyvinyl acetal resin is manufactured by a method such as advancing acetalization reaction of a polyvinyl alcohol and an aldehyde. In commercial processes, for improving production efficiency of the polyvinyl acetal resin, material is often added in excess against the number of reacting moles, and unintended side reaction products caused from such material added in an excessive amount may be formed. Such side reaction products affect the color, durability and so on of a synthetic resin film. Accordingly, eliminating such side reaction products effectively is important. Japan Patent Registration No. 5588091 presents a process of treating resin slurry with heat, and Japan Patent Registration No. 5926602 presents a method of advancing acetalization reaction under the condition of high temperature and high pressure with a predetermined hydrogen ion concentration of an acid catalyst.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of producing a polyvinyl butyral resin includes a reaction step of preparing a polyvinyl butyral resin composition including i) a polyvinyl butyral resin, ii) a butanal, and iii) a hydroxy butyric acid, thereby producing a polyvinyl butyral resin composition having a butyral conversion rate of 77% or more.

The reaction step may include a preparation process of preparing a composition for reaction including i) a polyvinyl alcohol resin, ii) a butanal, and iii) a hydroxy butyric acid, and an acetalization process of preparing the polyvinyl butyral resin composition by advancing acetalization reaction of the composition for reaction.

The composition for reaction may include the hydroxy butyric acid in an amount of 0.1 to 5 parts by weight based on the butanal in an amount of 10 parts by weight.

The hydroxy butyric acid may be any one selected from the group consisting of beta-hydroxy butyric acid, gamma-hydroxy butyric acid, and compositions thereof.

The method of producing the polyvinyl butyral resin may further include a washing step after the reaction step, and the washing step is once or more washing with a washing solution having a weight ratio of 5 to 10 with respect to the polyvinyl butyral resin.

The polyvinyl butyral resin composition after the washing step may include a hydroxy butyric acid in an amount of 0.01 wt % or less.

The method of producing the polyvinyl butyral resin may decrease the amount of residual butanal by 5 mol % or more compared to producing polyvinyl butyral resin with a composition for reaction not including a hydroxy butyric acid.

In another general aspect, a film for lamination includes a lamination layer including i) a polyvinyl butyral resin composition including a polyvinyl butyral resin and 2-ethylhexanoic acid, and ii) a plasticizer.

The amount of the 2-ethylhexanoic acid inside the lamination layer may be more than 0 ppm, and 70 ppm or less based on the entire lamination layer.

The lamination layer may have a difference in yellow index before and after an accelerated weathering test (based on 744 hours) by d YI evaluation, and the difference may be less than 3.

The polyvinyl butyral resin may be one derived from acetalization reaction of a polyvinyl alcohol resin and a butanal in the presence of a hydroxy butyric acid.

A laminated glass may include a laminate in which a first glass is located on one side of the film for lamination, and a second glass is located on the other side of the film for lamination.

In another general aspect, a film for lamination includes a lamination layer including i) a polyvinyl butyral resin composition including a polyvinyl butyral resin and a hydroxy butyric acid, and ii) a plasticizer.

The lamination layer may have a yellow index of 2.7 or less.

The amount of the hydroxy butyric acid inside the lamination layer may be more than 0 ppm, and 70 ppm or less.

Other features and aspects will be apparent from the following detailed description, and the claims.

DETAILED DESCRIPTION

Hereinafter, embodiments of the present disclosure will be described in detail such that they can easily be made by those skilled in the art to which the present disclosure pertains. The present disclosure may, however, be embodied in many different forms and should not be construed as limited to the example embodiments set forth herein.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

In the present specification, the term "combination of" included in Markush type description means mixtures or combinations of one or more elements described in Markush type and thereby means that the disclosure includes one or more elements selected from the Markush group.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Herein, weight average molecular quantity or number average molecular quantity is expressed with omitting Dalton (Da) that is the unit. The weight average molecular quantity and so on are described based on the values measured using gel permeation chromatography (GPC)—Evaporative Light Scattering Detector (ELSD), however the measuring method is not limited thereto.

In the present specification, ppm, the unit expressing the amount is based on weight.

The object of the present disclosure is to provide a method of producing a polyvinyl butyral resin composition which can improve durability of a film and a film for glass lamination including the polyvinyl butyral resin composition.

According to one or more example embodiments of the present disclosure a way of decreasing yellowing of a polyvinyl butyral film and enhancing durability of the film was surprisingly discovered. It was discovered that acidic substance in a trace amount affected yellowing occurrence and weakened durability in an extruding process of a polyvinyl butyral film which proceeded in a relatively high temperature, thereby identifying such acidic substance and a method of reduction thereof to decrease yellowing of polyvinyl butyral film and enhance durability of the film as described herein.

A method of producing a polyvinyl butyral resin according to one or more example embodiments comprises a reaction step of preparing a polyvinyl butyral resin composition comprising i) a polyvinyl butyral resin, ii) a butanal, iii) a hydroxy butyric acid.

The reaction step comprises a preparation process of preparing a composition for reaction comprising a polyvinyl alcohol resin, a butanal, and a hydroxy butyric acid, and an acetalization process of preparing the polyvinyl butyral resin composition by advancing acetalization reaction of the composition for reaction.

The method of producing a polyvinyl butyral resin, improves reaction efficiency, lowering the amount of residual butanal inside the polyvinyl butyral resin composition produced. When the composition for reaction is applied to manufacture of a film, the progress of oxidation reaction is prevented due to the presence of the hydroxy butyric acid, and as a result a polyvinyl butyral film, in which the amount of 2-ethylhexanoic acid is decreased, which is considered as a cause of yellowing occurrence inside a lamination film, can be produced.

The method of producing the polyvinyl butyral resin has a conversion rate of butanal of 77% or more, of 80% or more, of 80 to 90%, or of 83 to 90%.

The above range is a considerably high conversion rate of butanal, and when such a polyvinyl butyral resin composition is applied to manufacture of a film, generation of reaction by-products derived from butanal due to residual butanal can be prevented and a polyvinyl butyral resin having a more excellent quality and a film for lamination manufactured from the polyvinyl butyral resin can be produced.

The conversion rate of butanal, may be calculated with the amount of butanal based on mole or weight. For example, the conversion rate of butanal is calculated with production quantity of butanal group (acetalization degree) drawn from actual products, based on the amount of butanal group (mol) which must be contained inside the resin when 100% reaction is done, and the calculated ratio is expressed as %.

The polyvinyl butyral resin composition may have a residual butanal quantity of 17 mol % or less with respect to the amount of butanal comprised in the composition for reaction after the reaction step. For example, the polyvinyl butyral resin composition may have a residual butanal quantity of 17 mol % or less, of 10 to 17 mol %, or of 10 to 13 mol % based on the amount of butanal group comprised inside the polyvinyl butyral resin and a total amount of the residual butanal.

In commercial processes of synthesizing polyvinyl acetals represented by polyvinyl butyral, for production efficiency an aldehyde (butanal, etc.) in an excessive amount is added against the stoichiometric number of moles, accordingly a residual aldehyde (butanal, etc.) after reaction generates reaction products derived from aldehyde through processes such as aldol condensation reaction, reduction, oxidation, and so on.

Out of these reaction products derived from aldehyde, particularly acidic substance (for example, 2-ethylhexanoic acid generated by applying butanal) is harmful to environment and may induce yellowing or degraded durability of the polyvinyl acetal film manufactured using the same. Particularly, due to a property of a polyvinyl butyral resin, the decomposition is easily accelerated by acid, for example, in processes of manufacturing a film for lamination proceeding in relatively high temperature, yellowing of the film may occur easily and durability of the film may be adversely affected.

To address these problems, reducing the amount of residual aldehyde after acetalization reaction is needed.

An aldehyde injected in processes of producing a resin is converted to polyvinyl acetal with a total amount, in an ideal case. But substantially such a reaction proceeding is difficult and instead an unintended additive oxidation reaction of aldehyde may proceed due to water and the like generated by dehydration reaction of a polyvinyl alcohol when the polyvinyl alcohol is present with an aldehyde.

For example, in a process of inducing acetalization reaction of a polyvinyl alcohol and a butanal, by-products may be generated by oxidation reaction of the butanal, thereby the amount of butanal itself applied to synthesizing of a polyvinyl butyral may be decreased, and the conversion rate of the butanal may be lowered. Additionally, in such a process the amount of vinyl alcohol group which may be converted to a polyvinyl butyral by dehydration reaction of a polyvinyl alcohol also may be decreased, so that the conversion rate of the polyvinyl alcohol to polyvinyl butyral also may be decreased.

Therefore, in the present disclosure the composition for reaction comprises a hydroxy butyric acid, to prevent oxidation reaction of butanal, that is one cause of lowering conversion rate of butanal in the process of synthesizing the polyvinyl butyral.

The composition for reaction may comprise the hydroxy butyric acid in an amount of 0.1 to 5 parts by weight based on the butanal (butyraldehyde) in an amount of 10 parts by weight. In addition, the composition for reaction may comprise the hydroxy butyric acid in an amount of 0.1 to 3.5 parts by weight based on the butanal in an amount of 10 parts by weight. When the composition for reaction comprises a hydroxy butyric acid in such ranges, the effect of preventing oxidation reaction of butanal and further enhancing conversion rate to polyvinyl butyral can be obtained. Hydroxy butyric acid in such ranges leads to decrease in the amount of residual butanal inside a synthesized resin composition and decrease in the amount of reaction by-products derived from butanal, particularly acidic reaction products.

The polyvinyl butyral resin composition may comprise a hydroxy butyric acid in an amount of 0.01 wt % or less, of more than 0 wt %, and 0.01 wt % or less, or of 0.0001 wt % to 0.01 wt %.

The hydroxy butyric acid may be one selected from the group consisting of alpha-hydroxy butyric acid, beta-hydroxy butyric acid, gamma-hydroxy butyric acid, and compositions thereof, and further specifically may be beta-hydroxy butyric acid or gamma-hydroxy butyric acid.

The hydroxy butyric acid functions as enhancing butyral conversion rate in acetalization reaction, and after that being eliminated thereof from the produced polyvinyl butyral resin composition is good. The hydroxy butyric acid is water-soluble and after the reaction process may be eliminated in a process of washing in water and the like. Accordingly, the hydroxy butyric acid is eliminated after functioning as enhancing acetalization reaction efficiency, so that substantially, it may be comprised inside the produced polyvinyl butyral composition in a considerably trace amount.

Except the one including the hydroxy butyric acid, general compositions for reaction and methods of producing are applicable.

For example, the polyvinyl alcohol may have a polymerization degree of 1,600 to 3,000, or of 1,700 to 2,500. When such a polyvinyl alcohol is applied, a polyvinyl butyral resin for film manufacture, of which mechanical properties like a penetration resistance are excellent, may be obtained.

The polyvinyl butyral may be produced by acetalization reaction of a polyvinyl alcohol with the butanal. The acetalization reaction may proceed under a catalyst, and the catalyst may be an acidic catalyst, for example, hydrochloric acid, sulfuric acid, nitric acid may be applied, for example, nitric acid may be applied, but the catalyst is not limited thereto.

The butanal may be a n-butyl aldehyde, and in this case a produced polyvinyl butyral resin may have a property of refractive index that has a small difference with the refractive index of glass, and may have a property of excellent adhesion with glass and the like.

In the synthesized polyvinyl butyral resin, the amount of butyral group and hydroxyl group may be adjusted depending on mole ratio of the polyvinyl alcohol resin and butanal to be applied. For example, inside the polyvinyl alcohol resin, two hydroxyl group and the one butanal are combined thereby forming butyral group. Accordingly, the number of moles of butanal comprised in the composition for reaction may be applied considering the number of moles of vinyl alcohol inside the polyvinyl alcohol resin and a targeted butylation degree after synthesis.

The polyvinyl butyral resin synthesized in this manner may have hydroxyl group in an amount of 30 mol % or more, and acetyl group in an amount of 3 mol % or less. Specifically, the amount of the hydroxyl group may be 30 to 50 mol %, and the amount of the acetyl group may be 2 mol % or less. In addition, the value of weight average molecular quantity may be 200,000 to 300,000. When a polyvinyl butyral resin having these characteristics is applied, a film for lamination can be manufactured having excellent adhesion with glass and the like, and excellent mechanical strength.

The polyvinyl butyral resin synthesized in this manner may have hydroxyl group in an amount of 40 mol % or less, and acetyl group in an amount of 3 mol % or more. And the third polyvinyl acetal may have hydroxyl group in an amount of 5 to 30 mol % and acetyl group in an amount of 3 to 20 mol %. When a polyvinyl having these characteristics is applied, a polyvinyl acetal film having a sound insulation quality can be manufactured.

The method of producing the polyvinyl butyral resin may have a neutralization step, a washing step, and a drying step in order. The detailed content of each step is not limited specially, and methods applied to manufacture of a polyvinyl butyral resin can be utilized.

A base may be applied to the neutralization step. The base may be a base applied in a neutralization reaction, and for example, may be a sodium hydroxide but the base is not limited thereto.

The washing step includes applying a washing solution to the polyvinyl butyral resin composition after passing the reaction step or neutralization step.

For example, the washing step is once or more washing with a washing solution having weight ratio of 1 to 20 with respect to the polyvinyl butyral resin. The washing step may be once or more washing with a solution having 5 to 10 weight ratio, and may be washing of five times or more.

The washing solution may be distilled water and the like, but solutions that can be used for washing are applicable without limit.

The method of producing a polyvinyl butyral resin may decrease the amount of residual butanal with 5 mol % or more, compared to one produced with a composition for reaction not comprising the hydroxy butyric acid.

When the polyvinyl butyral resin is applied to manufacture of a film for lamination, the amount of 2-ethylhexanoic acid contained inside the film for lamination may be more than 0 ppm, and 70 ppm or less.

As one of by-products derived from the butanal (Formula 1 below), 2-ethylhexanoic acid (Formula 2 below) is an acidic substance, and this is thought to be a substance affecting yellowing index and durability of a manufactured film.

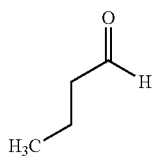

[Formula 1]

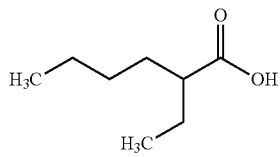

[Formula 2]

The present disclosure may lower the amount of residual butanal itself contained inside a produced polyvinyl butyral resin composition, and may also lower the amount of 2-ethylhexanoic acid which is derived from the same and induces yellowing generation or weakening of durability.

The polyvinyl butyral resin composition according to one or more other example embodiments of the present disclosure comprises i) a polyvinyl butyral resin derived by acetalization reaction of a polyvinyl alcohol resin and a butanal in the presence of a hydroxy butyric acid, and ii) a butanal (residual butanal), wherein the conversion rate of the butanal is 77% or more and the amount of the residual butanal is 17 mol % or less, based on the amount of butyral group comprised inside the polyvinyl butyral resin just after the reaction completed and as a total amount of the residual butanal. The conversion rate of the butanal is calculated based on mole.

The polyvinyl butyral resin composition may comprise the hydroxy butyric acid in an amount of 0.01 wt % or less after passing a washing process.

The function and the applied amount of the hydroxy butyric acid, detailed description about a polyvinyl alcohol resin and the like are duplicated with the above description and thus further description will be omitted here. In addition, the amount of residual butanal, the amount of the hydroxy butyric acid and the like are also duplicated with the above description and thus further description will be omitted here.

The film for lamination according to one or more other example embodiments of the present disclosure comprises a lamination layer including i) a polyvinyl butyral resin composition including a polyvinyl butyral resin and 2-ethylhexanoic acid; and ii) a plasticizer.

The lamination layer may comprise 2-ethylhexanoic acid in an amount of more than 0 ppm, and 70 ppm or less, of more than 0 ppm, and 50 ppm or less, or of 0.1 ppm to 40 ppm. Such a considerably low amount of 2-ethylhexanoic acid means that the amount of the most troublesome substance out of acidic ingredients affecting the quality of a film in a process of manufacturing a film, is remarkably lowered, and this characteristic may enhance the color and durability of a film.

The lamination layer may further comprise a hydroxy butyric acid.

The amount of the hydroxy butyric acid inside the lamination layer is more than 0 ppm, and 70 ppm or less, more than 0 ppm, and 50 ppm or less, or 0.1 ppm to 40 ppm.

As described above a polyvinyl butyral resin produced by advancing acetalization reaction in the presence of a hydroxy butyric acid can lower the amount of residual butanal itself considerably inside a composition. Besides, applying such a method enables the amount of such reaction by-products derived from butanal to be decreased, particularly it was experimentally verified that the amount of 2-ethylhexanoic acid which is an acidic ingredient may be decreased by the method. This is one important factor which can prevent the loss of optical properties and mechanical properties of a film for lamination manufactured at relatively high temperature.

The lamination layer may have a yellow index (YI) of 2.7 or less, of 2.5 or less, of 0.1 to 2.5, or of 0.1 to 1.2. Such a yellow index is measured in accordance with ASTM E313 standard. This is thought to be the result of the lowered amount of acidic ingredients inside a resin composition, allowing damage of a polyvinyl butyral caused from acid to be decreased and the yellow index to be lowered.

The lamination layer may have a difference in yellow index before and after an accelerated weathering test (based on 744 hours) by d-YI evaluation, and the difference may be less than 3.

The film for lamination according to one or more other example embodiments comprises a lamination layer comprising i) a polyvinyl butyral resin composition comprising a polyvinyl butyral resin and a hydroxy butyric acid; and ii) a plasticizer.

The amount of the hydroxy butyric acid inside the lamination layer may be more than 0 ppm, and 70 ppm or less, more than 0 ppm, and 50 ppm or less, or 0.1 ppm to 40 ppm.

The lamination layer may further comprise 2-ethylhexanoic acid, for example, may comprise 2-ethylhexanoic acid in an amount of more than 0 ppm, and 70 ppm or less, more than 0 ppm, and 50 ppm or less, or 0.1 to 40 ppm.

The lamination layer may have a yellow index of 2.7 or less, of 2.5 or less, of 0.1 to 2.5, or of 0.1 to 1.2. Such a yellow index is measured in accordance with ASTM E313 standard.

The lamination layer may have a difference in yellow index before and after an accelerated weathering test (based on 744 hours) by d-YI evaluation, and the difference may be less than 3.

The film for lamination may have a monolayer structure or a multilayer structure.

When the film for lamination is a monolayer structure a polyvinyl butyral resin described above is applied to the film, and when the film for lamination is a multilayer structure the polyvinyl butyral resin described above is applied to at least one layer of the film. That is, when the film for lamination is a monolayer structure, the film may comprise the polyvinyl butyral resin as described above, and when the film for lamination is a multilayer structure, at least one layer of the film may comprise the polyvinyl butyral resin as described above.

The plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA), and mixtures thereof. Specifically, triethylene glycol bis 2-ethylhexanoate (3G8) may be applied as the plasticizer.

For example, the film for lamination may have a three-layer structure with first layer—second layer—first layer.

The first layer may comprise a first polyvinyl acetal in an amount of 60 to 75 parts by weight and the plasticizer in an amount of 25 to 40 parts by weight. The polyvinyl acetal resin composition described above in which the amount of residual butanal has been lowered, may be applied as the first polyvinyl acetal. A plasticizer described above may be applied as the plasticizer.

In this case the first layer can function as a skin layer and has excellent adhesion with transparent laminates like glass besides giving excellent mechanical strength to laminated glass and the like.

The film for lamination may further comprise a second layer disposed on the first layer and comprising a second polyvinyl acetal and a plasticizer.

The second layer may comprise the second polyvinyl acetal in an amount of 58 to 69 parts by weight and the plasticizer in an amount of 31 to 42 parts by weight. A polyvinyl acetal resin composition described above in which the amount of residual butanal has been lowered may be applied as the second polyvinyl acetal. A plasticizer described above may be applied as the plasticizer.

When the film for lamination comprises the second layer, the second layer can function as a sound insulation layer, and the film comprising the second layer can have excellent mechanical strength and excellent insulating performance.

For example, the film for lamination may be a four-layer structure with first layer—third layer—second layer—first layer, or a five-layer structure with first layer—third layer—second layer—third layer—first layer.

The film for lamination may further comprise a third layer disposed between the first layer and the second layer and comprising a third polyvinyl acetal and a plasticizer.

The third layer may comprise the third polyvinyl acetal in an amount of 58 to 80 parts by weight and the plasticizer in an amount of 20 to 42 parts by weight. A polyvinyl acetal resin composition described above in which the amount of residual butanal has been lowered may be applied as the third polyvinyl acetal. A plasticizer described above may be applied as the plasticizer. The amount of hydroxyl group of the third polyvinyl acetal may be a value between the amount of hydroxyl group in the first polyvinyl acetal and the amount of hydroxyl group in the second polyvinyl acetal.

In a case of manufacturing a film with four-layer structure or five-layer structure, the film can have an excellent sound insulating quality with wider temperature range, and in which delamination can be reduced remarkably by decreasing interlayer heterogeneity.

The film for lamination may have a yellow index of 2.7 or less, of 2.5 or less, of 0.1 to 2.5, or of 0.1 to 1.2. Such a yellow index is measured in accordance with ASTM E313 standard.

A film for lamination having such a yellow index may have excellent properties in transparency and color, and superior durability because the film has considerably low yellow index.

The film for lamination may have a difference in yellow index before and after an accelerated weathering test (based on 744 hours) by d-YI evaluation, and the difference may be less than 3.

For example, the first layer may have a yellow index of 2.7 or less, of 2.5 or less, of 0.1 to 2.5, or of 0.1 to 1.2.

For example, the second layer may have a yellow index of 2.7 or less, of 2.5 or less, of 0.1 to 2.5, or of 0.1 to 1.2.

For example, the third layer may have a yellow index of 2.7 or less, of 2.5 or less, of 0.1 to 2.5, or of 0.1 to 1.2.

Plasticizers applied to each layer of the film may be the same or different.

The film for lamination may further contain an additive selected from the group consisting of an antioxidant, a heat stabilizer, a UV absorber, a UV stabilizer, an IR absorber, a glass adhesion regulator, and combinations thereof. The additive may be comprised at least one layer within the layers as above, and due to inclusion of the additive, long-term durability such as thermal stability and light stability, and anti-scattering performance of the film can be enhanced.

As the antioxidant, a hindered amine-based antioxidant or a hindered phenol-based antioxidant may be used. Specifically, on the process of manufacturing polyvinyl butyral (PVB) which needs a processing temperature of 150° C. or higher, a hindered phenol-based antioxidant may be used. The hindered phenol-based antioxidant, for example, may be Irganox 1976, 1010, or so on available from BASF SE.

As the heat stabilizer a phosphite-based heat stabilizer may be used considering suitability with an antioxidant. The heat stabilizer, for example, may be Irgafos 168 available from BASF SE.

As the UV absorber, Chemisorb 12, Chemisorb 79, Chemisorb 74, or Chemisorb 102 available from CHEMIPRO KASEI KAISHA, LTD or Tinuvin 328, Tinuvin 329, or Tinuvin 326 available from BASF SE may be used. As the UV stabilizer, Tinuvin available from BASF SE may be used. As the IR absorber, Indium Tin Oxide (ITO), Antimony Tin Oxide (ATO), and Antimony Zinc Oxide (AZO) may be used, and as the glass adhesion regulator, a salt of a metal such as magnesium (Mg), potassium (K), sodium (Na), epoxy-based modified silicon (Si) oil, or a mixture thereof may be used, but the present disclosure is not limited thereto.

The film may have a total thickness of 0.4 mm or more, for example, of 0.4 to 1.6 mm, of 0.5 to 1.2 mm, or 0.6 to 0.9 mm. The range of thickness is suitable considering meeting performance requirements while minimizing cost.

The film may consist of the first layer, or may comprise the first layer.

A thickness of the second layer comprised in the film may be 0.04 to 0.20 mm, 0.07 to 0.18 mm, or 0.09 to 0.15 mm.

A thickness of the third layer comprised in the film may be 0.1 mm or less, 0.09 mm or less, 0.001 to 0.1 mm, 0.001 to 0.08 mm, or 0.001 to 0.3 mm.

The film may comprise a second layer, and may have a loss coefficient of 0.35 or more measured under the temperature condition of 20° C. and the frequency condition of 2,000 to 4,000 Hz.

A laminated glass according to one or more other example embodiments of the present disclosure comprises a laminate comprising a first glass located on one side of the film for lamination and a second glass located on the other side of the film for lamination.

The first glass and the second glass refer to a platy clear glass, and materials like a light-transmitting plastic may be applicable taking the place of some or all thereof.

The laminated glass may be used for glass in automobiles, interior or exterior materials of architecture, and the like, and may also have a low yellow index and excellent durability.

An automobile according to one or more other example embodiments of the present disclosure comprises a laminated glass described above. The laminated glass may be applied as a windshield, for example, as the front glass of the automobile.

Specifically, the automobile comprises a body forming the body of the automobile, a driver attached to the body (engine, etc.), a drive wheel attached to be rotatable to the body, a connector connecting the drive wheel and the driver, and a windshield attached to a part of the body, which is a laminated glass shielding external wind. The body, the driver, the drive wheel, and the connector may be applied without limit if they are units generally applied to an automobile.

The laminated glass may provide a windshield having impact resistance, penetration resistance, sound insulation, and so on as having excellent optical properties.

Hereinafter, specific example embodiments of the present disclosure will be described in more detail. These specific examples are for illustration only and should not be construed as limiting. In the description of experiment below, "%" refers to wt % in the case where it is uncertain whether wt % or mol % is intended.

1. Producing of Polyvinyl Butyral Resin Compositions

1) Synthesis of PVB Resin Composition (A) (Example 1)

A polyvinyl alcohol (PVA) of 60 g having a polymerization degree of 1700, and a saponification degree of 99% was thrown into distilled water at 90° C. of 540 g thereby preparing a PVA aqueous solution in an amount of 10 wt %, after that the PVA aqueous solution was put into a reactor. After the temperature of the reactor was lowered to 17° C., a hydrochloric acid of 36 g having a purity of 37% was injected as a catalyst, and in the state of the temperature of the reactor maintained at 50 to 55° C., a n-butanal of 33 parts by weight having a purity of 98% and beta-hydroxy butyric acid of 3 parts by weight were injected, to perform the synthesis of a polyvinyl butyral (PVB).

After that, to obtain a synthesized PVB resin in a solid state and eliminate acid thereof, a neutralization process is carried out. First, the temperature of the reactor was lowered to 20° C., and neutralization was carried out for 1 hour by injecting NaOH of 100 g divided in a small portion, thereby obtaining a PVB in a solid state. When the reaction ended the value of pH was 10.5. The obtained PVB resin composition was washed using distilled water, wherein the amount of distilled water was 10 times that of the PVB resin, and washing was repeated six times. After that, the washed PVB resin composition was dried in a warm breeze and in which moisture was eliminated thereby obtaining the PVB resin composition (A) in Example 1 in the state of powder.

2) Synthesis of PVB Resin Composition (B) (Example 2)

A polyvinyl alcohol (PVA) of 60 g having a polymerization degree of 1700, and a saponification degree of 99% was thrown into distilled water at 90° C. of 540 g thereby preparing a PVA aqueous solution in an amount of 10 wt %, after that the PVA aqueous solution was put into a reactor. After the temperature of the reactor was lowered to 17° C., a hydrochloric acid of 36 g having a purity of 37% was injected as a catalyst, and in the state of the temperature of the reactor maintained at 50 to 55° C., a n-butanal of 33 parts by weight having a purity of 98% and gamma-hydroxy butyric acid of 3 parts by weight were injected, to perform the synthesis of a polyvinyl butyral (PVB). A neutralization process, washing, and drying after this were applied in the same way with 1) as above, thereby obtaining the PVB resin composition (B) in Example 2 in the state of powder.

3) Synthesis of PVB Resin Composition (C) (Comparative Example 1)

A polyvinyl alcohol (PVA) of 60 g having a polymerization degree of 1700, and a saponification degree of 99% was thrown into distilled water at 90° C. of 540 g thereby preparing a PVA aqueous solution in an amount of 10 wt %, after that the PVA aqueous solution was put into a reactor. After the temperature of the reactor was lowered to 17° C., a hydrochloric acid of 36 g having a purity of 37% was injected as a catalyst, and in the state of the temperature of the reactor maintained at 50 to 55° C., a n-butanal of 33 parts by weight having a purity of 98% was injected in a small portion of 36 g, to perform the synthesis of a polyvinyl butyral (PVB) for 3 hours. A neutralization process, washing, and drying after this were applied in the same way as above resin composition (A), thereby obtaining the PVB resin composition (C) in Comparative Example 1.

2. Property Evaluation of Polyvinyl Butyral Resin Compositions

Analysis of the residual amount of beta/gamma-hydroxy butyric acid inside the resin composition was performed as follows.

After a PVB resin composition in the state of powder was dissolved in THF (tetrahydrofuran), as ACN (acetonitrile) was added in a small portion only substances having a high molecular quantity were allowed to be reprecipitated, and the solution of only an upper layer portion was separated, in which substances having a low molecular quantity (500 to 2000 amu) had been dissolved, to perform analysis in accordance with high resolution liquid chromatograph-mass spectroscopy (HR LC-MS) using the solution as a sample.

The separated sample was separated from ACN solution of 10% using C18 column (Hypersil Gold C18) and detected in 210 nm with the condition of erupting with ACN of 100% after 9 minutes. And the sample was ionized by Electrospray Ionization (ESI) mode at 320° C. and checking of ingredients thereof was carried out with MS/MS method thereby confirming a hydroxy butyric acid detected around retention time (RT) 0.765.

For quantitative analysis of beta/gamma-hydroxy butyric acid, samples were prepared, to which each beta/gamma-hydroxy butyric acid was injected in certain quantities of 50 ppm, 100 ppm, and 500 ppm. And the samples were measured in the same condition as above thereby making a calibration curve, so that the beta/gamma hydroxy butyric acid detected inside the resin composition was quantified, respectively.

As the result of detection, it was represented as Pass if the residual amount of beta/gamma-hydroxy butyric acid was 0.01 wt % or less, or represented as Fail if not.

Characteristics and the like of the composition for reaction and the synthesized polyvinyl butvral resin composition are arranged in Table 1 and Table 2 below, respectively.

TABLE 1

| (Parts by Weight) | Distilled Water | PVA | Concentration of Solution | Amount of n-Butanal | Additive Type | Additive Amount | Mole of n-Butanal[1] | Mole of PVA[2] |
|---|---|---|---|---|---|---|---|---|
| Resin Composition A (Example 1) | 540 | 60 | 10.00% | 33 | BHB+ | 3 | 0.448 | 1.349 |
| Resin Composition B (Example 2) | 540 | 60 | 10.00% | 33 | GHB+ | 3 | 0.448 | 1.349 |
| Resin Composition C (Comparative Example 1) | 540 | 60 | 10.00% | 36 | — | — | 0.489 | 1.349 |

+ BHB and GHB refer to beta-hydroxy butyric acid and gamma-hydroxy butyric acid, respectively. It is same in Table 2, and the name is abbreviated as hydroxy butyric acid.

1) Mole of n-Butanal=Input of n-Butanal*Purity of n-Butanal/Molecular Quantity of n-Butanal.

Molecular Quantity of n-Butanal: 72.11 g/mol, Purity of 98%.

2) Mole of PVA=Input of PVA/Molar Mass of PVA.

Molar Mass of PVA (Saponification Degree of 99%): 44.4702 g/mol.

TABLE 2

Characteristics of Polyvinyl Butyral Resin Composition (mol %)

| | Butyral Group | Hydroxyl Group | Acetyl Group | Content of Butyral inside PVB resin When Synthesized in 100%[3] | Conversion Rate to Butyral (%)[4] | Amount of Unreacted Butyral (mol %)[5] | Difference of Unreacted Butyral (mol %)[6] | Amount of Residual Butyral after Conversion (mol, Calculated Value)[7] | Residual Amount of Hydroxy Butyric Acid inside Resin Composition |
|---|---|---|---|---|---|---|---|---|---|
| Resin Composition A (Example 1) | 55.4 | 43.8 | 0.8 | 66.5 | 83.3 | 11.10 | 6.10 | 0.050 | Pass |
| Resin Composition B (Example 2) | 55.1 | 44.1 | 0.8 | 66.5 | 82.9 | 11.40 | 5.80 | 0.051 | Pass |

TABLE 2-continued

Characteristics of Polyvinyl Butyral Resin Composition (mol %)

| | Butyral Group | Hydroxyl Group | Acetyl Group | Content of Butyral inside PVB resin When Synthesized in 100%[3] | Conversion Rate to Butyral (%) [4] | Amount of Unreacted Butyral (mol %) [5] | Difference of Unreacted Butyral (mol %) [6] | Amount of Residual Butyral after Conversion (mol, Calculated Value)[7] | Residual Amount of Hydroxy Butyric Acid inside Resin Composition |
|---|---|---|---|---|---|---|---|---|---|
| Resin Composition C (Comparative Example 1) | 55.3 | 43.9 | 0.8 | 72.5 | 76.3 | 17.20 | — | 0.084 | N/A[8] |

3) Content of Butyral inside PVB resin When Synthesized in 100% is the value when it is supposed that injected n-butanal reacts in 100% thereby generating PVB, and calculated by Equation 1 below.

Content of Butyral inside PVB resin When Synthesized in 100% (mol %)=Mole of n-Butanal/(Mole of PVA/2)*100    Equation (1):

4) Conversion Rate to Butyral (%)=Content of Generated Butyral/(Content of Butyral inside PVB resin When Synthesized in 100%)*100

5) Amount of Unreacted Butyral (mol %)=(Content of Butyral inside PVB resin When Synthesized in 100% [mol %]–Content of Butyral Group in Polyvinyl Butyral Resin [mol %])

6) Difference of the Amount of Unreacted Butyral between the Case in which Hydroxy Butyric Acid Is Applied and the Case in which Hydroxy Butyric Acid Is Not Applied (%)=(Amount of Residual Butyral after Conversion When Hydroxy Butyric Acid Is Not Applied)–(Amount of Residual Butyral after Conversion When Hydroxy Butyric Acid Is Applied)

7) Amount of Residual Butyral after Conversion=Mole of Butanal inside Composition for Reaction*Amount of Unreacted Butyral/100

8) Resin Composition C is not a target of a detecting evaluation because it does not include hydroxy butyric acid.

Referring to the description of Table 1 and Table 2 above, it can be verified that the conversion rate to butyral is enhanced and butanoic acid applied as an additive is eliminated easily in a process of washing, when hydroxy butyric acid is applied as an additive. In addition, it is verified that the case in which hydroxy butyric acid is applied and the case in which hydroxy butyric acid is not applied have a considerable difference in the amount of unreacted butanal (mole of unreacted butanal/mole of injected butanal) remaining without being converted. In Comparative Example 1, the content ratio of residual butanal is about 17.18%. When compared with the content ratio of residual butanal in examples, this content ratio is 6.1% more (based on mole, 17.18-11.16) than about 11.16% in Example 1, and 5.8% more (based on mole, 17.18-11.38) than about 11.38% in Example 2.

3. Manufacture of a Film for Lamination
1) Preparation of an Additive Mixture

Irganox 1010 and Irgafos 168 in an amount of 0.1 parts by weight respectively, Tinuvin P in an amount of 0.3 parts by weight, potassium acetate (K Ac) in an amount of 0.022 parts by weight, and magnesium acetate (Mg Ac) in an amount of 0.028 parts by weight were mixed thereby preparing an additive mixture of 0.55 parts by weight.

2) Manufacture of a Film for Lamination in Example 1

Polyvinyl butyral resin composition (A) of 72.45 parts by weight with 3G8 as a plasticizer in an amount of 27 parts by weight and the additive mixture of 0.55 parts by weight added was put into a twin-crew extruder and through a T-die the film for lamination having a total thickness of 780 μm in Example 1 was manufactured.

3) Manufacture of a Film for Lamination in Example 2

Polyvinyl butyral resin composition (B) of 72.45 parts by weight with 3G8 as a plasticizer in an amount of 27 parts by weight and the additive mixture of 0.55 parts by weight added was put into a twin-crew extruder and through a T-die the film for lamination having a total thickness of 780 μm in Example 2 was manufactured.

4) Manufacture of a Film for Lamination in Comparative Example 1

Polyvinyl butyral resin composition (C) of 72.45 parts by weight with 3G8 as a plasticizer in an amount of 27 parts by weight and the additive mixture of 0.55 parts by weight added was put into a twin-crew extruder and through a T-die the film for lamination having a total thickness of 780 μm in Comparative Example 1 was manufactured.

4. Property Evaluation of the Film for Lamination
1) Analysis for Residual Amount of Beta/Gamma-Hydroxy Butyric Acid inside the Film for Lamination After a manufactured PVB film was dissolved in THF (tetrahydrofuran), as ACN (acetonitrile) was added in a small portion only substance having a high molecular quantity were allowed to be reprecipitated, and the solution of only an upper layer portion was separated, in which substance having a low molecular quantity (500 to 2000 amu) had been dissolved, to perform analysis in accordance with HR LC-MS using the solution as sample.

The separated sample was separated from ACN solution of 10% using C18 column (Hypersil Gold C18) and detected in 210 nm with the condition of erupting with ACN of 100% after 9 minutes. And the sample was ionized by ESI mode at 320° C. and checking of ingredients thereof was carried out with MS/MS method thereby confirming a hydroxy butyric acid detected around RT 0.765.

For quantitative analysis of beta/gamma-hydroxy butyric acid, samples were prepared, to which each beta/gamma-hydroxy butyric acid was injected in certain quantities of 50 ppm, 100 ppm, and 500 ppm. And the samples were measured in the same condition as above thereby making a calibration curve, so that the beta/gamma hydroxy butyric acid detected inside the resin composition was quantified, respectively.

As the result of detection, it was represented as Pass if the residual amount of beta/gamma-hydroxy butyric acid was 70 ppm or less, or represented as Fail if not, in Table 3 below.

2) Analysis of Residual Amount of 2-Ethylhexanoic Acid inside the Film for Lamination Reaction by-products derived from butanal inside the film for lamination were analyzed using Thermal Desorption-Gas Chromatograph/Mass Spectrometer (TD-GC/MS).

Each 0.5 g from the films manufactured in example and comparative example was taken respectively and allowed to pass a first heating detaching unit and a second heating detaching unit inside Thermal Desorption (TD) (JTD-505111 available from JAI). The temperature was applied in 150° C. (PAT sample tube) and −40° C. (cold trap), PAT heating time was 15 minutes and SAT (sample tube) detaching time was 3 minutes. Split ratio was 1/50.

The samples passing the TD were separated and detected through GC-MS. Specifically, 7890B (GC) and 5977A (MS) available from AGI LENT applied with HPSMS column (0.25 mm×30 m×0.25 μm) were used for the experiment, under the condition of Oven: 40° C. (5 min holding) −10° C./min −280° C. (5 min holding) −10° C./min −300° C. (9 min holding).

2-ethyl-hexanol (RT 12.49) and 2-ethyl-hexanoic acid (RT 14.14) that were target substances detected at the time between 12 minutes and 15 minutes were quantitatively analyzed with flame ionization (FID) detector.

For quantitative analysis, standard samples in which 2-ethyl-1-hexanol was dissolved were prepared with three concentrations as follows—439 ppm, 1131 ppm, and 2695 ppm, and analysis thereof was carried out. After calibration curve was made with input quantity as the y-axis and peak area as the x-axis, the residual amount of 2-ethylhexanoic acid was confirmed by performing relative quantification with respect to the substances in two types.

3) YI Evaluation (Yellow Index Evaluation)

The yellow index (YI) of the film for lamination was measured in accordance with ASTM E313.

Specifically, samples were prepared by laminating through heating and pressing for 10 minutes at 150° C. in a laminator with a laminated structure of release film—sheet—release film (silicon coating PET). And after the release films were removed from the samples, the samples were measured under the condition of D65 and 10 degree, using UltraScan Pro available from HUNTER LAB, and the result is shown in Table 3 below.

4) d-YI Evaluation Method

An accelerated weathering test of a laminated glass was carried out in accordance with KS M ISO 4892-3:2002 and the durability was evaluated based on d-YI (difference in yellow index).

Glass with 70 mm×150 mm and a thickness of 2.1 mm and the film for lamination manufactured as above were applied respectively thereby preparing a laminated structure of glass—film—glass, and pre-lamination and main lamination thereof were performed. The initial value of yellow index ($YI_{initial}$) in the center of samples in a state of being laminated was measured using a measuring apparatus available from HUNTER LAB in accordance with ASTM E313 standard.

Samples of which the initial value had been measured were put into a QUV apparatus and an accelerated weathering test thereof was performed for 744 hours. After the test, the final value of yellow index ($YI_{final}$) in the center of samples was measured and the difference in yellow index was calculated by Equation (3) as follows.

$$d\text{-}YI = YI_{final} - YI_{initial} \quad \text{Equation (3):}$$

Calculated d-YI was sorted as Fail if it was greater than 3, or sorted as Pass if it was smaller than 3 and the result is shown in Table 3 below.

5) Penetration Resistance Evaluation of the Sheet

Penetration resistance of laminated glass was evaluated in accordance with KS L 2007.

Glass with 300 mm×300 mm and a thickness of 2.1 mm and above film for lamination in Examples 1 and 2, and Comparative Example 1 as a film were applied respectively thereby preparing laminated structures of glass—film—glass as sheet 1, sheet 2, and sheet 3, respectively. Pre-laminating in vacuum, deaeration and edge sealing thereof were performed. After that, samples were prepared by main laminating at 150° C. for 2 hours using an autoclave. After that, dropping a hard ball of 2.26 kg was performed on the sample, and the height when a sample was penetrated by the ball (MBH) was measured. At that time, it was represented as Fail if the sample was penetrated by the ball in a height under 4 m, or represented as Pass if the sample was penetrated by the ball in a height of 4 m or higher.

6) Impact Resistance Evaluation of the Sheet

Whether laminated glass was missing when impact resistance evaluated in accordance with KS L 2007:2008 was evaluated.

The process of laminating glass with a thickness of 2.1 mm and films of sheet 1 to sheet 3 respectively and the process of preparing a laminated structure of glass—film—glass was carried out in the same way with the penetration resistance evaluation as above.

As a low temperature evaluation, dropping a hard ball of 227 g was performed from a height of 9 m after the ball had been kept for 4 hours at minus 20° C., and it was represented as Fail if a sample which took impact was broken and when glass was scattered the amount of glass dropped from a sheet was 15 g or more, or represented as Pass if a sample which took impact was not broken or when glass was scattered the amount of glass dropped from a sheet was less than 15 g.

As a room temperature test, dropping a hard ball of 227 g was performed from a height of 10 m after the ball had been kept for 4 hours at 40° C., and it was represented as Fail if a sample which took impact was broken and when glass was scattered the amount of glass dropped from a sheet was 15 g or more, or represented as Pass if a sample which took impact was not broken or when glass was scattered the amount of glass dropped from a sheet was less than 15 g.

TABLE 3

| Items for Evaluation | Example 1 | Example 2 | Comparative Example 1 |
|---|---|---|---|
| Residual Amount of Hydroxy Butyric Acid inside a Film | pass | pass | n/a* |
| Residual Amount of 2-Ethylhexanoic Acid inside a Film (ppm)** | 38 | 41 | 101 |
| Color of a Film (Yi) | 1.0 | 1.1 | 3.8 |
| Durability of a Film (d-YI) | Pass | Pass | Fail |
| Penetration Resistance | pass | pass | pass |
| Impact Resistance (Low Temperature) | pass | pass | pass |
| Impact Resistance (Room Temperature) | pass | pass | pass |

*It is not a target of detecting evaluation.
**ppm was evaluated by the method described as above based on weight.

Referring to the Table 3, examples in which the amount of 2-ethylhexanoic acid was lower out of the reaction remains show excellent color or durability of the film compared to a comparative example. In addition, penetration resistance and impact resistance were also excellent in the result.

According to the examples described herein, a method of producing a polyvinyl butyral resin and a film for glass lamination including the polyvinyl butyral resin can produce a polyvinyl butyral resin composition in which yellowing does not substantially occur and durability is enhanced, and can provide a film for glass lamination including the polyvinyl butyral resin composition.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of producing a polyvinyl butyral resin comprising:
    a reaction step of reacting i) a polyvinyl alcohol resin, ii) a butanal, and iii) a hydroxy butyric acid, thereby producing a polyvinyl butyral resin composition of which butyral conversion rate is 77% or more.

2. The method of producing a polyvinyl butyral resin of claim 1,
    wherein the reaction step comprises a preparation process of preparing a composition for reaction comprising i) the polyvinyl alcohol resin, ii) the butanal, and iii) the hydroxy butyric acid; and
    an acetalization process of preparing the polyvinyl butyral resin composition by advancing acetalization reaction of the composition for reaction.

3. The method of producing a polyvinyl butyral resin of claim 2,
    wherein the composition for reaction comprises the hydroxy butyric acid in an amount of 0.1 to 5 parts by weight based on the butanal in an amount of 10 parts by weight.

4. The method of producing a polyvinyl butyral resin of claim 2,
    wherein the amount of residual butanal is decreased by 5 mol % or more compared to producing polyvinyl butyral resin with a composition for reaction not comprising a hydroxy butyric acid.

5. The method of producing a polyvinyl butyral resin of claim 1,
    wherein the hydroxy butyric acid is any one selected from the group consisting of beta-hydroxy butyric acid, gamma-hydroxy butyric acid, and compositions thereof.

6. The method of producing a polyvinyl butyral resin of claim 1, further comprising a washing step after the reaction step, and the washing step is once or more washing with a washing solution having a weight ratio of 5 to 10 with respect to the polyvinyl butyral resin,
    wherein the polyvinyl butyral resin composition after the washing step comprises a hydroxy butyric acid in an amount of 0.01 wt % or less.

* * * * *